(12) United States Patent
Hanlon, Jr.

(10) Patent No.: US 8,404,753 B2
(45) Date of Patent: Mar. 26, 2013

(54) METHOD FOR DEGRADING WATER-SOLUBLE POLYMERIC FILMS

(76) Inventor: Robert Joseph Hanlon, Jr., Noblesville, IN (US)

( * ) Notice: Subject to any disclaimer, the term of this patent is extended or adjusted under 35 U.S.C. 154(b) by 269 days.

(21) Appl. No.: 12/946,113

(22) Filed: Nov. 15, 2010

(65) Prior Publication Data

US 2011/0118436 A1     May 19, 2011

Related U.S. Application Data

(60) Provisional application No. 61/261,916, filed on Nov. 17, 2009.

(51) Int. Cl.
*C08J 11/04*     (2006.01)
(52) U.S. Cl. ............ 521/45; 521/40; 528/480; 528/499; 528/502 C; 528/502 D; 528/502 A
(58) Field of Classification Search .................... 521/40, 521/40.5, 41, 45, 45.5, 46, 47, 48, 49, 49.8; 528/480, 495, 499, 500, 502 R, 502 C, 502 D, 528/503; 210/348, 749, 767, 768, 769, 776, 210/780, 781
See application file for complete search history.

(56) References Cited

U.S. PATENT DOCUMENTS

| | | | |
|---|---|---|---|
| 3,496,856 A | 2/1970 | Wiggins | |
| 3,515,575 A | 6/1970 | Arnold | |
| 4,748,049 A | 5/1988 | Charles et al. | |
| 4,770,089 A | 9/1988 | Vinicombe | |
| 5,010,131 A | 4/1991 | Wagner | |
| 5,025,713 A | 6/1991 | Ouellette | |
| 5,147,557 A | 9/1992 | Purnell | |
| 5,201,954 A | 4/1993 | Holt | |
| 5,223,141 A * | 6/1993 | Brown et al. | 210/634 |
| 5,236,506 A | 8/1993 | Mazakas | |
| 5,240,504 A | 8/1993 | Mazakas | |
| 5,250,189 A | 10/1993 | Rey | |
| 5,256,308 A | 10/1993 | Dulany | |
| 5,620,786 A | 4/1997 | Honeycutt et al. | |
| 5,769,703 A | 6/1998 | Conlin | |
| 5,891,812 A | 4/1999 | Honeycutt et al. | |
| 6,346,150 B1 | 2/2002 | Conlin | |
| 6,673,263 B2 | 1/2004 | Albu et al. | |
| 6,854,135 B2 | 2/2005 | Jones et al. | |
| 2004/0000329 A1 | 1/2004 | Albu et al. | |
| 2009/0044902 A1 * | 2/2009 | Wycech | 156/247 |
| 2009/0095400 A1 | 4/2009 | Stelter et al. | |

* cited by examiner

*Primary Examiner* — Frances Tischler
(74) *Attorney, Agent, or Firm* — Ryan O. White; Taft, Stettinius & Hollister, LLP

(57) ABSTRACT

A method of degrading a water-soluble, synthetic polymeric film being at least partially covered with a paint material. The method includes placing the film in an extractor apparatus and separating the paint material from the film. The paint material is collected from a water-based solution with a filtration media. The film is degraded in the extractor apparatus.

10 Claims, No Drawings

METHOD FOR DEGRADING WATER-SOLUBLE POLYMERIC FILMS

RELATED APPLICATIONS

This application claims priority to U.S. Provisional Patent Application Ser. No. 61/261,916, filed Nov. 17, 2009, which is hereby incorporated by reference.

TECHNICAL FIELD

The invention relates to apparatuses and associated methods for using water-soluble polymeric films to form protective covers and/or for use in paint spray booth masking operations.

BACKGROUND OF THE INVENTION

Paint spray booths are often used for painting objects and are frequently incorporated within industrial and manufacturing operations, including, but not limited to, the automotive, aerospace, marine, collision repair and furniture industries. Because of the complex nature of such painting operations, robotic equipment is often used to assist with applying the paint onto the desired objects. Because the paint is applied to these objects through a spraying application, the robotic equipment is susceptible to having some of the airborne paint particles accumulate on its surface, thereby potentially damaging the equipment and/or contaminating the object being painted if some of the wet or dried paint drips/sheds off during the process.

In addition to the airborne paint potentially interfering with the sprayed objects and/or robotic equipment, it is also possible for the overspray to cause a layer of tacky or dried paint to accumulate on the walls of the paint booth. To remove this accumulated paint residue, volatile organic compounds (VOCs) or other such chemical solvents are often used. However, as these VOCs are costly and known to be environmentally hazardous, it is desirable to avoid their use.

One process that has been used to address the above-referenced problems is to drape loose cloth shrouds over various portions of the robotic equipment and/or the walls of the paint booth so that the airborne paint particles are not allowed to accumulate directly on the associated equipment or surrounding structures. However, these shrouds often still allow dry paint particles (or lint) to shed off during the painting process, as well as require frequent cleaning. Another alternative solution is to apply a tacky coat or white grease to the surrounding environment, including the walls, windows, conveyors, pumps, hoses, floors and purge stations. In order to clean these areas, however, several hundred hours of manpower and consumables are required, as well as dangerous equipment and strong VOCs must be used to complete the cleaning process. In addition, the VOCs or other chemical solvents must be dealt with in an environmentally-friendly manner, and it can be difficult to separate these chemicals from the equipment and cloth shrouds in such a manner.

The present invention overcomes or ameliorates at least one of the prior art disadvantages discussed above or provides a useful alternative thereto.

SUMMARY OF THE INVENTION

In accordance with certain aspects of the present invention, a roll of water-soluble polymeric film is spread, cut and sewn into a custom designed cover that can be used for a painting application. In certain specific aspects of the present invention, the water-soluble polymeric film is a polyvinyl alcohol (PVA) material and is used to form at least one of a body cover, a manipulator cover, a vertical arm cover, a horizontal arm cover, a base cover, a hose cover, a combination cover, a wrist cover, a recip cover, a purge cover, a gun cover, a bell cover, a cabinet cover, a seat cover, a steering wheel cover and a full body vehicle cover.

In accordance with yet further aspects of the present invention, the water-soluble polymeric film is a PVA 3 mil polymeric film that may be degraded and recycled after use when subjected to a temperature in the range of from about 100° F. to about 250° F. In still other aspects of the present invention, a roll of PVA film is slit, rewound and a water-based adhesive material is applied to the film.

In one exemplary aspect of the present invention, a method is provided for degrading a water-soluble, synthetic polymeric film in which the film is at least partially covered with a paint material. The method includes placing the film in an extractor apparatus and separating the paint material from the film. The paint material is collected from a water-based solution with a filtration media and the film is degraded in the extractor apparatus. In form of this method, the degrading comprises submerging the film in water having a temperature of about 100-250° F. In another form thereof, the degrading comprises directing high pressure steam or water at the film. The pressure can be about 20 psi or more.

The method can also include agitating the film with water in the extractor apparatus and exposing the film to a centrifugation process in the extractor apparatus. In the degrading process, the film can be dissolved. The method can further include collecting water-insoluble materials after the film is degraded. The collecting step can comprise skimming paint waste particles with a PVOH filtration media.

In a different aspect, an eco-friendly method is provided for discarding paint waste material that partially covers a water-soluble, synthetic polymeric film. The method includes placing the film in an extractor apparatus and separating the paint waste material from the film. The film is degraded in the extractor apparatus. The method also includes collecting the paint waste material outside the extractor apparatus. In form of the degrading step, the film is disposed in water having a temperature between 100-250° F. Alternatively, the degrading step can include directing high pressure steam or water at the film.

In another aspect of the present invention, a method of degrading a water-soluble, synthetic polymeric film being at least partially covered with a paint waste substance is provided. The method includes placing the film in a first extractor apparatus, separating the paint waste substance from the film, degrading the film in the first extractor apparatus, and collecting the paint waste substance with a water-soluble, synthetic polymeric filtration media. The method can also include placing the filtration media and collected paint waste substance in a second extractor apparatus, separating the paint waste substance from the filtration media, degrading the filtration media in the second extractor apparatus, removing the paint waste substance from the second extractor apparatus, and collecting the paint waste substance for reuse.

In one aspect, the film can be exposed to water having a temperature between 100-250° F. or high pressure steam having a temperature between 100-250° F. In a different aspect, the filtration media can be exposed to water having a temperature between 100-250° F. or high pressure steam having a temperature between 100-250° F. The film can further be exposed to a water agitation and centrifugation process.

The method can also include separating non-soluble materials from the film and collecting the non-soluble materials. In addition, the method can include filtering any water used in the degrading steps through a waste water treatment system. In one advantageous aspect of this method, the filtration media can include polyvinyl alcohol.

In the above-referenced methods, an environmentally-friendly process is established for handling films, covers, gloves, wipers, booth masking, conveyor masking, window masking, light masking, hose masking, motor masking, pump masking, vehicle masking, robot masking, etc. These methods can reduce the amount of time for cleaning robots or painting equipment, for example, and the waste materials can be handled in an eco-friendly manner.

DETAILED DESCRIPTION OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

As explained above, the present invention is directed to apparatuses and associated methods for using and degrading water-soluble polymeric films to form protective covers (e.g., gloves, covers, cloths, filter media, wipers, booth masking, conveyor masking, window masking, light masking, hose masking, motor masking, pump masking, vehicle masking, robot masking, etc.). The water-soluble polymeric covers and masking operations in accordance with the teachings of the present invention can be used to protect stationary and moveable parts of robotic painting equipment from overspray paint. The nature of the materials used herein will reduce the chemical usage of volatile organic compounds and will allow cleaning time and other such consumables to be minimized or eliminated. In addition, the teachings of the present invention allow the displacement of bags and covers that are made of polyethylene, and are instead recyclable or easily degradable, thereby drastically reducing the need to add environmentally dangerous materials to waste landfills.

Advantages and improvements of the apparatuses, processes and methods of the present invention are discussed in more detail below and demonstrated in the following exemplary examples. These examples are illustrative only and are not intended to limit or preclude other embodiments of the invention.

Example 1

Robot Covers

A water-soluble polymeric film (i.e., a PVOH film—EN-ViRO FiLM™—RJ Hanlon Company, Inc. of Westfield, Ind.) is received in a rolled form (60" wide×1,000 linear yards). The material is placed on a custom designed spreading wheel in 50, 100, 150 or 200 ply layers. The material is then pulled down the cutting table by a custom engineered winch. The marker (printed custom designs in Gerber CAD) is then placed on top of the material. Each part is individually cut with a vertical mechanical knife, bundled and marked for assembly.

Each cover is completely custom-designed and manufactured. Assembly of the cover will take it through several steps including: single needle stitch, serge stitch, a poly thread, monofilament thread, rubber, elastic, poly binding, large snap, small snap, back tack, burn-off, inspection, label and packaging. Packaging is dictated completely by the customer (1, 2, 10 etc. per bag).

The covers are all unique as they are custom designed and are completely fiber-free and anti-static. In use, the cover acts as a barrier that benefits the end-user in many facets, including, but not limited to, protecting the robotic equipment from overspray paint; reducing down-time associated with stopping and cleaning the robots with solvents; reducing VOCs and solvent usage from reduced maintenance/down-time; and reducing defects by helping collect overspray paint and preventing solvents from getting on painted finish.

Example 2

Booth Masking

A water-soluble polymeric film (i.e., a PVOH film—EN-ViRO FiLM™—RJ Hanlon Company, Inc. of Westfield, Ind.) is received in a rolled form (60" wide×1,000 linear yards). The material is sent to a contracted fabricator that applies a water soluble adhesive to the film. The film is then slit and wound to 24", 36", 48" or 60"×100 Linear Yard Rolls. After arriving to the end user, the film is applied to the walls, windows, conveyors, pumps, hoses, floors, purge stations and more.

As stated above, traditional processes require the application of a tacky coat, white grease, or nothing to the above-mentioned areas. Thus, in order to clean these areas, several hundred man-power hours are needed, in addition to dangerous equipment, strong VOCs and a tremendous amount of consumables.

By using the water-soluble polymeric films of the present invention to mask off the booth, the end user is able to save money associated with labor, chemicals and consumables.

Example 3

Disposal

As described above, in one exemplary embodiment of the present invention, a water-soluble polymeric film can be used for covering robotic, paint equipment and/or walls or other objects in a paint room, for example, to protect such items from airborne paint particles. The film can be used, however, for any desirable purpose. In this embodiment, the film can be used to protect robotic and other paint equipment prior to a painting operation. During the painting operation, the film can become saturated with paint. As such, there is a need for cleaning and/or disposing of the film after the operation while also handling the dry (and sometimes wet) paint particles in an environmentally-friendly manner.

In an exemplary method, the paint-saturated film can be removed from the robots, walls, and other equipment or objects on which the film covers. The film can then be degraded by placing it in an extractor apparatus or processing tank. An example of an extractor that can be used during this process is an E-Series High. Performance Front Load Commercial Washer manufactured by Continental Girbau, Inc. However, extractors are well-known, and one skilled in the art could use other extractors to achieve the desired results of the exemplary method.

Once the film is placed inside the extractor apparatus, the film can be submerged in water and/or subjected to high pressure steam or water. The temperature of the water can be between 100-250° F. If high pressure steam or water is directed onto the film, the pressure can be about 20 psi or more. The film can be submerged in the water and exposed to high pressure steam or water; alternatively, only one of the two degradation steps can be employed.

In addition, the film can undergo water jet agitation and centrifugation processes. This process causes the polymeric materials to dissolve, and any leftover materials collected within the tank (e.g., the snaps, thread and elastic) can be collected in a basket liner and/or a filter media system for reuse if appropriate. For example, a cloth liner made of PVOH may include snaps for securing the liner to a wall or equipment during a painting operation. The snaps can be made of a plastic material, for example, that does not dissolve with the liner. As such, after the liner dissolves in the extractor apparatus, the snaps can be collected using a basket liner and/or a filter media.

In accordance with certain aspects of the present invention, the paint can be separated from the film in the extractor apparatus. Before use, the paint can be treated with a detackifier (e.g., PAINT KILL™ available from Nalco Company in Naperville, Ill.) to cause the paint particles to separate from the solution and float to the top of a channel or water canal outside the extractor. In this embodiment, the extractor apparatus can include several outlets including one in which water used to dissolve the film is removed from the extractor apparatus and recycled through a waste water treatment system. Another outlet removes the separated paint particles from the extractor apparatus and releases the particles into the water channel or canal. The channel or canal can also include water which is removed from the extractor apparatus. Similarly, the channel or canal can be a large tub which collects the paint particles removed from the extractor apparatus.

Once the paint particles are removed from the extractor apparatus, the particles can be skimmed off by a filter media. The filter media can be made of a water-soluble, polymeric material such as PVOH (polyvinyl alcohol). As the paint particles collects outside the extractor apparatus, the particles rise to the top surface of the water. This more easily allows for the skimming and collection of the paint particles by the filter media.

In another embodiment, the paint particles that are collected by the filter media can then be processed further. For example, the filter media and paint particles can be placed in a second extractor apparatus. The second extractor apparatus can be the same apparatus as used in the first extraction process in which the paint-covered film was degraded. A similar degradation process can be used for dissolving the filter media. In particular, the filter media can be submerged in water having a temperature between 100-250° F. In another aspect, the filter media can be exposed to high pressure steam or water. The pressure can be at least 20 psi, and in some embodiments, greater than 30 psi.

The filter media can further be degraded by incorporating water agitation and centrifugation processes in the degradation method. During these processes, approximately 385 G-force can be exposed to the filter media causing the paint particles to separate from the media and the resulting media to dissolve.

As the paint particles are separated from the filter media, the particles can form a sludgy material. The paint sludge material is still dangerous to the environment, so in an advantageous aspect of the above-described methods, the sludge material is collected outside the second extractor apparatus. For example, an outlet of the second extractor apparatus can be coupled to a collection bin or tank. As such, the paint sludge can exit the apparatus and be dumped into the bin or tank. The water in the second extractor apparatus can also be released into the bin or tank, or alternatively, the water can be transferred to a waster water treatment system or other system. The water can then be recycled and reused in additional degradation processes. The paint sludge material can be transported to another facility and/or used to form other products such as a filler in asphalt, concrete blocks, landscaping blocks, parking blocks, etc.

After the degradation process, the filtration media is dissolved without any environmentally-hazardous waste. Likewise, the water used to dissolve the media can be recycled and reused in other processes. Also, the remaining paint particles are separated from the filter media, collected in a transport bin or tank, and can be taken to another facility where the particles can be used to form another by-product.

As described above, the water-soluble, polymeric film and filler media can be formed of a synthetic polymer. For example, the film and media can be formed of polyvinyl alcohol (PVOH). Other materials can be used within the scope of the present invention as known by the skilled artisan.

The film and media can include any ENViRO-FiLM™ protective covering or material from R.J. Hanlon Company, Inc. The ENViRO-FiLM™ protective covering or material is a fiber free, chemical resistant and non-toxic material that can advantageously separate paint from the film, as described in the degradation processes above. For instance, an ENViRO-FiLM™ glove can be used for cleaning and protective purposes. The glove can be dip and/or weld manufactured. The glove can be made from PVOH and is water soluble. After use, the glove can be placed in an extractor apparatus such that paint and other hazardous materials are separated therefrom and recaptured for further processing. During the extraction process, the glove can be degraded similar to the PVOH film described above.

An ENViRO-FiLM™ wiper can also be used for cleaning paint and other hazardous materials. After cleaning, the wiper having paint and the other hazardous materials coated thereon can be extracted according to the previously described processes such that the paint and other hazardous materials are separated from the wiper and collected for further processing. The wiper, made of a PVOH material that is water soluble, can be degraded similar to the film described above. Other materials, such as paint suits or coveralls, head, eye, and mask wear, and shoe covers, which can be covered in paint may be extracted and processed as described above.

The degradation and extraction processes can further be used for separating hazardous materials such as oil from PVOH covers, sponges, wipers, personal wear, sorbents, etc. This can be advantageous for those assisting with oil spill cleanup, for example, because the hazardous material can be separated from the PVOH material and handled in an environmentally-friendly manner.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of degrading a water-soluble, synthetic polymeric film, the film being at least partially covered with a waste material, comprising:
    placing the film in an extractor apparatus;
    separating the waste material from the film by submerging the film in water having a temperature between 100° F. and 250° F.;

collecting the waste material from the water with a PVOH filtration media, wherein the water has a temperature during the collection step of less than 100° F.; and degrading the PVOH filtration media in water having a temperature between 100° F. and 250° F.

2. The method of claim 1, further comprising directing high pressure steam or water at the film.

3. The method of claim 1, wherein the separation step is performed under a pressure of about 20 psi or more.

4. The method of claim 1, further comprising agitating the film with water in the extractor apparatus.

5. The method of claim 1, further comprising exposing the film to a centrifugation process in the extractor apparatus.

6. The method of claim 1, wherein the separation step comprises dissolving the film.

7. The method of claim 1, wherein the collection step comprises collecting water-insoluble materials from the water.

8. The method of claim 1, further comprising filtering the water through a waste water treatment system.

9. The method of claim 1, wherein the waste material comprises a paint material.

10. The method of claim 1, wherein the step of degrading the PVOH filtration media comprises degrading the PVOH filtration media in a second extractor apparatus.

* * * * *